(12) United States Patent
Kuo et al.

(10) Patent No.: US 11,360,257 B1
(45) Date of Patent: Jun. 14, 2022

(54) LIGHT GUIDE SUBSTRATE AND A BACKLIGHT MODULE INCLUDING THE SAME

(71) Applicant: Optivision Technology Inc., Hsinchu (TW)

(72) Inventors: Nan-Hung Kuo, Yilan (TW); Li-Jen Hsu, Zhuangwei Township, Yilan County (TW); Tsung-Hsien Wu, Hsinchu (TW); Young-Cheng Chou, New Taipei (TW)

(73) Assignee: OPTIVISION TECHNOLOGY INC., Hsinchu (TW)

( * ) Notice: Subject to any disclaimer, the term of this patent is extended or adjusted under 35 U.S.C. 154(b) by 0 days.

(21) Appl. No.: 17/243,222

(22) Filed: Apr. 28, 2021

(30) Foreign Application Priority Data

Jan. 19, 2021 (TW) .................................. 110101906

(51) Int. Cl.
*F21V 8/00* (2006.01)
*F21V 33/00* (2006.01)
(52) U.S. Cl.
CPC ......... *G02B 6/0053* (2013.01); *G02B 6/0065* (2013.01); *F21V 33/0052* (2013.01)
(58) Field of Classification Search
CPC .. G02B 6/0053; G02B 6/0065; F21V 33/0052
USPC ...................................................... 362/97.1
See application file for complete search history.

(56) References Cited

U.S. PATENT DOCUMENTS

| 8,281,510 | B2 * | 10/2012 | Yoshimura | ............. | G02B 5/124 |
| | | | | | 40/568 |
| 2007/0247562 | A1 * | 10/2007 | Shim | ................. | G02F 1/133606 |
| | | | | | 349/64 |
| 2015/0029745 | A1 * | 1/2015 | Asano | .................. | G02B 6/0055 |
| | | | | | 362/606 |

FOREIGN PATENT DOCUMENTS

| CN | 107907933 A | 4/2018 |
| TW | 200837452 A | 9/2008 |
| TW | I664477 B | 7/2019 |

OTHER PUBLICATIONS

Search Report appended to an Office Action, which was issued to Taiwanese counterpart Application No. 110101906 by the TIPO dated Oct. 27, 2021 with an English translation thereof (2 pages).

* cited by examiner

*Primary Examiner* — Andrew J Coughlin
*Assistant Examiner* — Jessica M Apenteng
(74) *Attorney, Agent, or Firm* — Hamre, Schumann, Mueller & Larson, P.C.

(57) ABSTRACT

A light guide substrate includes first and second triangular prisms juxtaposed to each other on a light exit face thereof. Each of the first and second triangular prisms has a rounded vertex. The number of the first triangular prisms is smaller than the number of the second triangular prisms. Each first triangular prism has a first height from the light exit face. Each second triangular prisms has a second height from the light exit face. The second height is between 20 and 90 percent of the first height. A backlight module includes the aforesaid light guide substrate, a reverse prism sheet disposed on the light guide substrate, and a light emitting unit to emit light rays into the light substrate.

10 Claims, 4 Drawing Sheets

LIGHT GUIDE SUBSTRATE AND A BACKLIGHT MODULE INCLUDING THE SAME

CROSS-REFERENCE TO RELATED APPLICATION

This application claims priority to Taiwanese Patent Application No. 110101906, filed on Jan. 19, 2021.

FIELD

The disclosure relates to a light guide substrate, and more particularly to a light guide substrate with a light exit face having first and second triangular prisms, and a backlight module including the light guide substrate.

BACKGROUND

A conventional backlight module generally has a light guide plate to provide a surface light source. The light guide plate of the conventional backlight module, such as that disclosed in Taiwanese Patent No. I664477, typically includes a plate body, a plurality of elongated microstructures and diffuser microstructures so that the backlight module is able to provide a uniform surface light source.

However, such a backlight module can encounter an adsorption phenomenon between a reverse prism sheet and the light guide plate, which can decrease the lighting quality of the backlight module.

SUMMARY

Therefore, one object of the disclosure is to provide a light guide substrate that can alleviate the draw back of the prior art.

According to the disclosure, a light guide substrate includes a light exit face, a plurality of first triangular prisms, a plurality of second triangular prisms, a light reflection face, a plurality of light guide microstructures, and a light entry face.

The first triangular prisms are disposed on the light exit face and extend in an X-axis direction.

The second triangular prisms are disposed on the light exit face and extend in the X-axis direction. The first and second triangular prism are juxtaposed to each other in a Y-axis direction. Each of the first and second triangular prisms has a rounded vertex extending away from the light exit face in a Z-axis direction. The number of the first triangular prisms is smaller than the number of the second triangular prisms. Each of the first triangular prisms has a first height from the light exit face in the Z-axis direction. Each of the second triangular prisms has a second height from the light exit face in the Z-axis direction. The second height is between 20 and 90 percent of the first height.

The light reflection face is opposite to the light exit face in the Z-axis direction.

The light guide microstructures are disposed on the light reflection face.

The light entry face extends in the Y-axis direction and interconnects the light exit and reflection faces.

Another object of the disclosure is to provide a backlight module.

According to another object of the disclosure, a backlight module includes the light guide substrate as mentioned hereinbefore, a reverse prism sheet, and a light emitting unit.

The reverse prism sheet is disposed above the light exit face of the light guide substrate. The reverse prism sheet has a plurality of prism lenses. Each of the prism lenses extends in the Y-axis direction and has a tip directed to the light exit face.

BRIEF DESCRIPTION OF THE DRAWINGS

Other features and advantages of the disclosure will become apparent in the following detailed description of the embodiment with reference to the accompanying drawings, of which.

DETAILED DESCRIPTION

Figure 1:
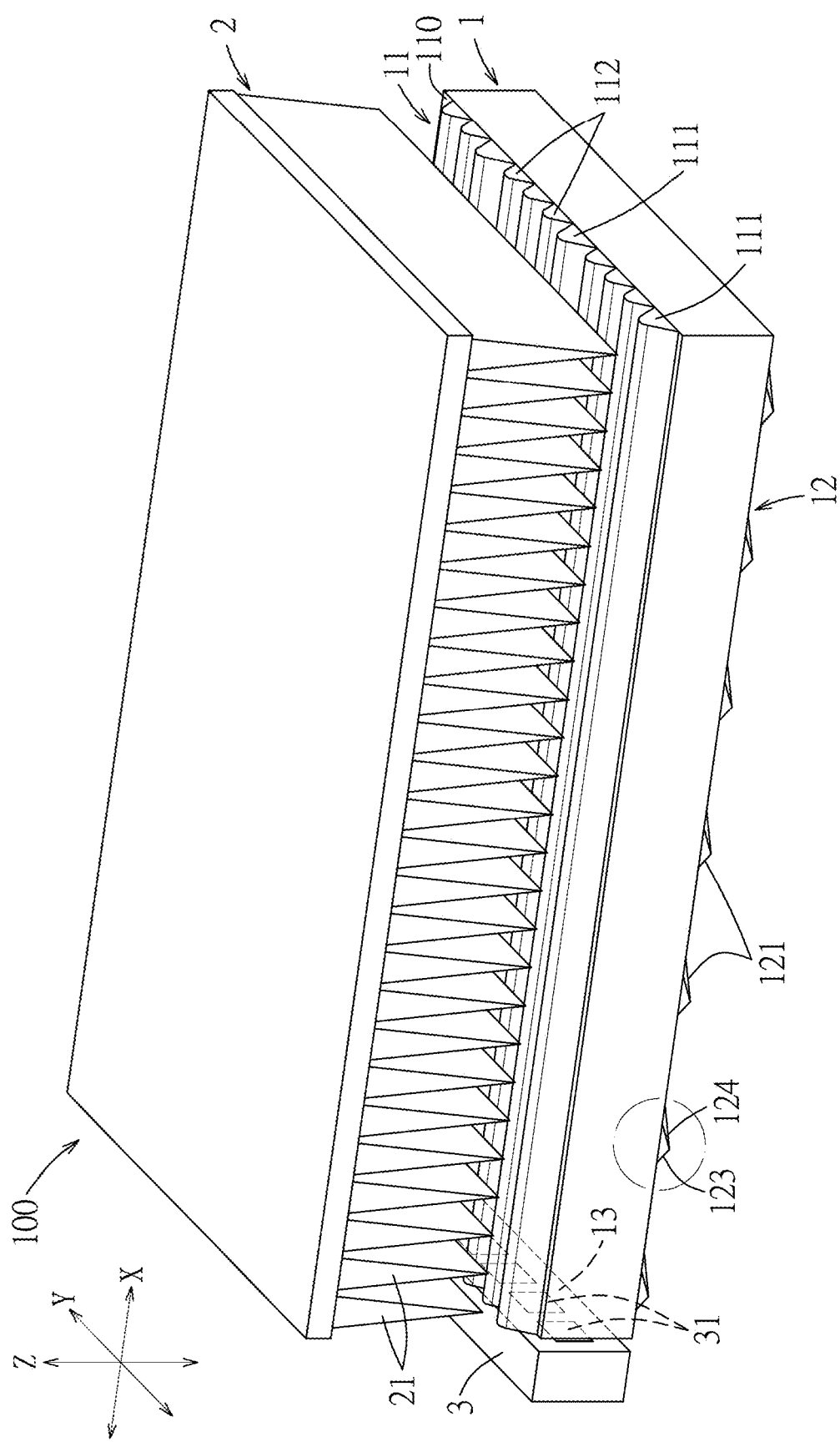
FIG. 1 is a perspective view illustrating a backlight module according to an embodiment of the disclosure.
Figure 2:
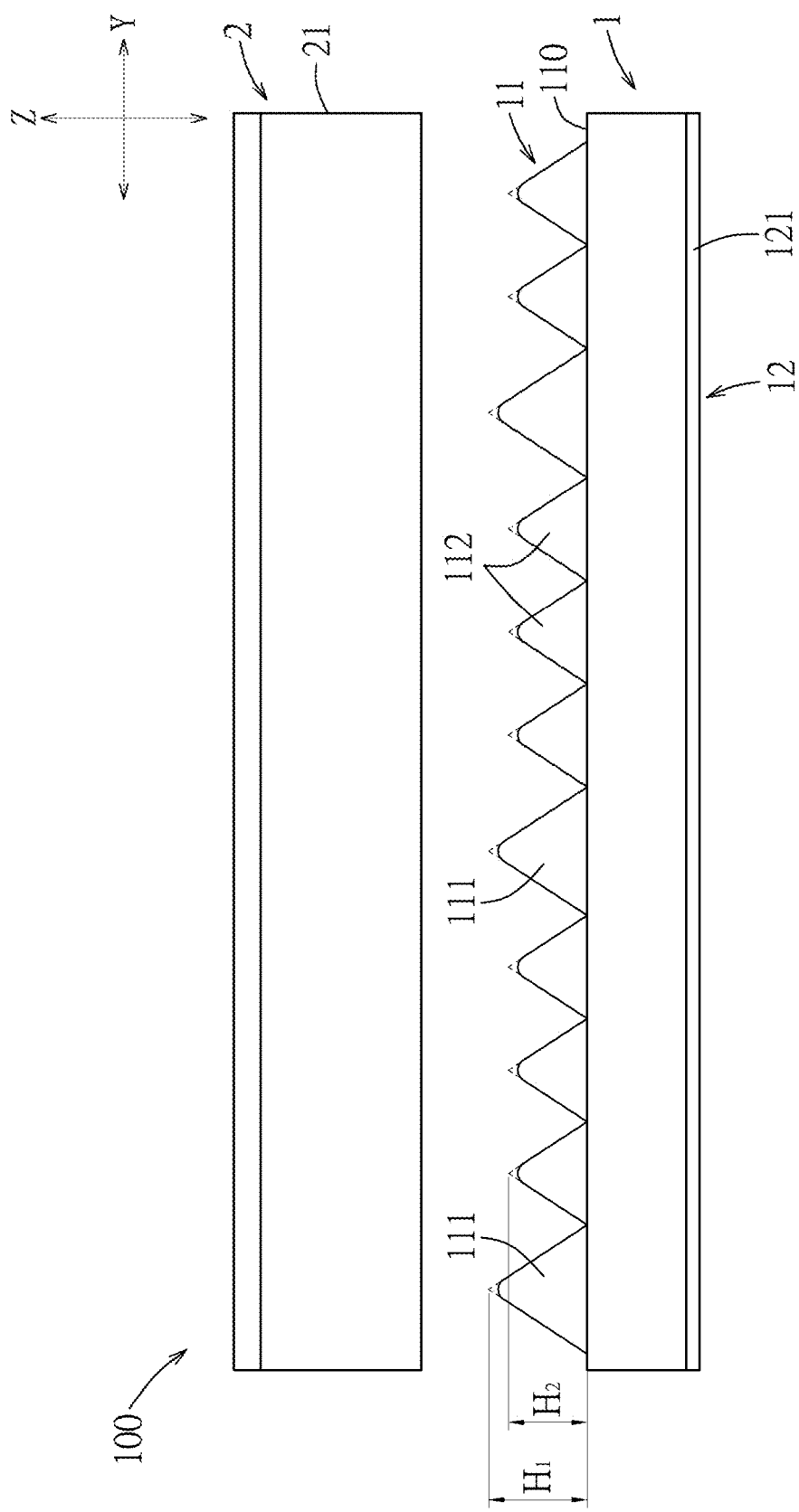
FIG. 2 is a side view of the embodiment.

FIGS. 1 and 2 illustrate a backlight module 100 of an embodiment according to the disclosure. The backlight module 100 includes a light guide substrate 1, a reverse prism sheet 2, and a light emitting unit 3.

The light guide substrate 1 includes a light exit face 11, a light reflection face 12, a plurality of first triangular prisms 111, a plurality of second triangular prisms 112, a plurality of light guide microstructures 121, and a light entry face 13. In this embodiment, the light guide substrate 1 is made of a polycarbonate material.

The first triangular prisms 111 are disposed on the light exit face 11 and extend in an X-axis direction. The second triangular prisms 112 are disposed on the light exit face 11 and extend in the X-axis direction. The first and second triangular prism 111, 112 are juxtaposed to each other in a Y-axis direction. Each of the first and second triangular prisms 111, 112 has a rounded vertex extending away from the light exit face 11 in a Z-axis direction. The number of the first triangular prisms 111 is smaller than the number of the second triangular prisms 112. The number of the first triangular prisms 111 is about 33 percent of the number of the second triangular prisms 112. The plurality of the first triangular prisms 111 are divided into several groups. In this embodiment, the groups of the first triangular prisms 111 are spaced apart from each other in the Y-axis direction by more than one of the second triangular prisms 112. However, in other embodiments, the groups of the first triangular prisms 111 may be spaced apart from each other by one of the second triangular prisms 112.

Each of the first and second triangular prisms 111, 112 is an isosceles triangular prism. In practice, the light exit face 11 has a prism layer 110 formed with the first and second triangular prisms 111, 112 and made of a transparent acrylic resin to protect the polycarbonate material between the light exit face 11 and the light reflection face 12 against scratches. Optionally, the refractive index of the acrylic resin may be 1.58.

As shown in FIG. 2, each of the first triangular prisms 111 has a first height (H1) from the light exit face 11 in the Z-axis direction. Each of the second triangular prisms 112 has a second height (H2) from the light exit face 11 in the Z-axis direction. The second height (H2) is between 20 and 90 percent of the first height (H1). The first and second heights (H1, H2) range from 5 to 30 µm.

The rounded vertex of each of the first triangular prisms 111 has a curvature radius ranging between 4 and 32 percent of the first height (H1). The rounded vertex of each of the second triangular prisms 112 has a curvature radius ranging between 4 and 32 percent of the second height (H2).

Figure 3:
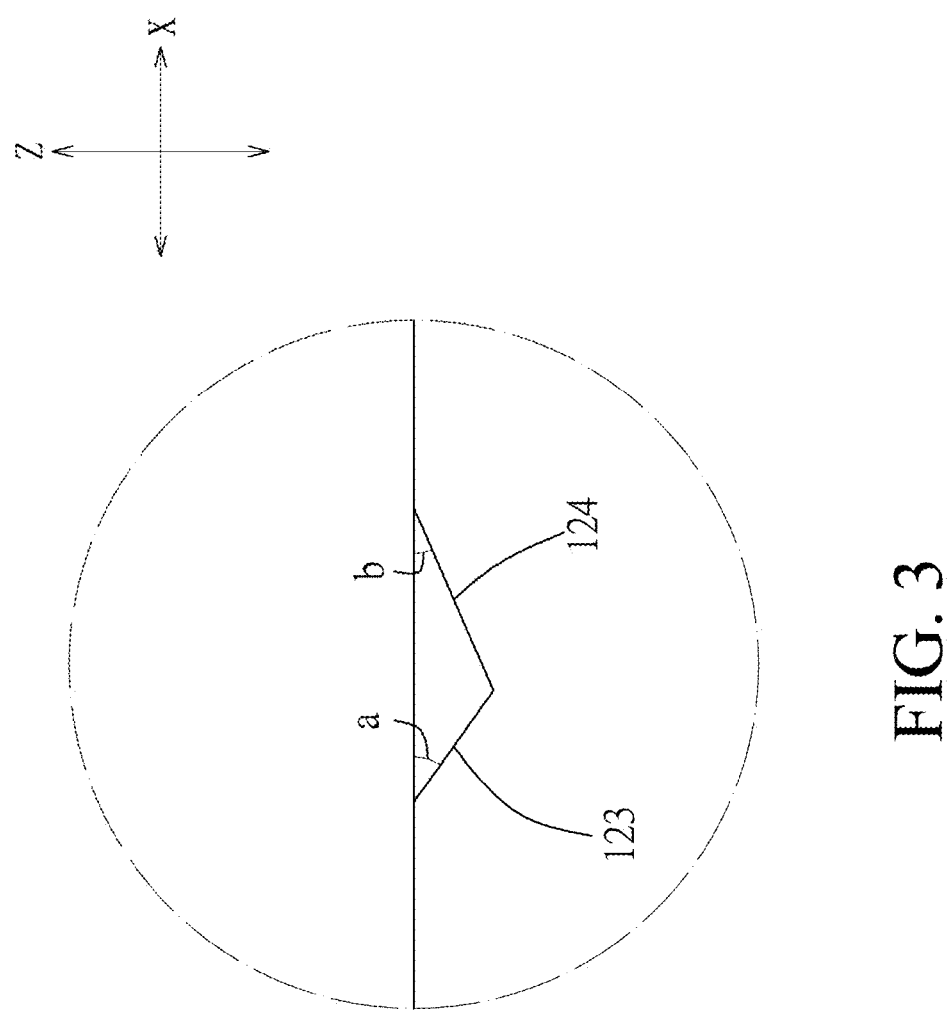
FIG. 3 is an enlarged view taken from an encircled region of FIG. 1.

The light reflection face 12 is opposite to the light exit face 11 in the Z-axis direction. The light guide microstructures 121 are disposed on the light reflection face 12. In this embodiment, the light guide microstructures 121 are elongated triangular prism structures that extend in the Y-axis direction and are spaced apart from each other in the X-axis direction. As shown in FIGS. 1 and 3, each of the light guide microstructures 121 has a first inclined face 123, and a second inclined face 124 forming a vertex with the first inclined face 123. The second inclined face 124 is more distal from the light entry face 13 than the first inclined face 123. An acute angle (b) of the second inclined face 124 with respect to an XY-plane is smaller than an acute angle (a) of the first inclined face 123 with respect to the XY-plane. The acute angle (a) ranges between 20 and 50 degrees. The acute angle (b) ranges between 1.0 and 3.0 degrees. Each microstructure 121 has a height from the light reflection face 12 in the Z-axis direction. The height of each microstructure 121 ranges from 1 to 5 µm.

The light entry face 13 extends in the Y-axis direction and interconnects the light exit and reflection faces 11, 12.

The reverse prism sheet 2 is disposed above the light exit face 11 of the light guide substrate 1, and has a plurality of prism lenses 21. Each of the prism lenses 21 is an isosceles triangular prism that extends in the Y-axis direction and that has a tip directed to the light exit face 11. In this embodiment, the prism lenses 21 are distal from the second triangular prisms 112 so that the adsorption phenomenon between the reverse prism sheet 2 and the light guide substrate 1 can be reduced to prevent the backlight module 100 from producing white haze areas.

The light emitting unit 3 is disposed adjacent to the light entry face 13 to emit light rays into the light guide substrate 1 through the light entry face 13. In this embodiment, the light emitting unit 3 includes a plurality of point light sources 31 arranged in a row extending the Y-axis direction.

When the light rays from the point light sources 31 enter the light guide substrate 1 through the light entry face 13, the light rays emitted to the light reflection face 12 are reflected by the light guide microstructures 121 to the light exit face 11 to increase brightness of the backlight module 100. The light rays emitted to the light exit face 11 are converged by the first and second triangular prisms 111, 112. The light rays emitted out of the light exit face 11 are further converged by the prism lenses 21.

Figure 4B:
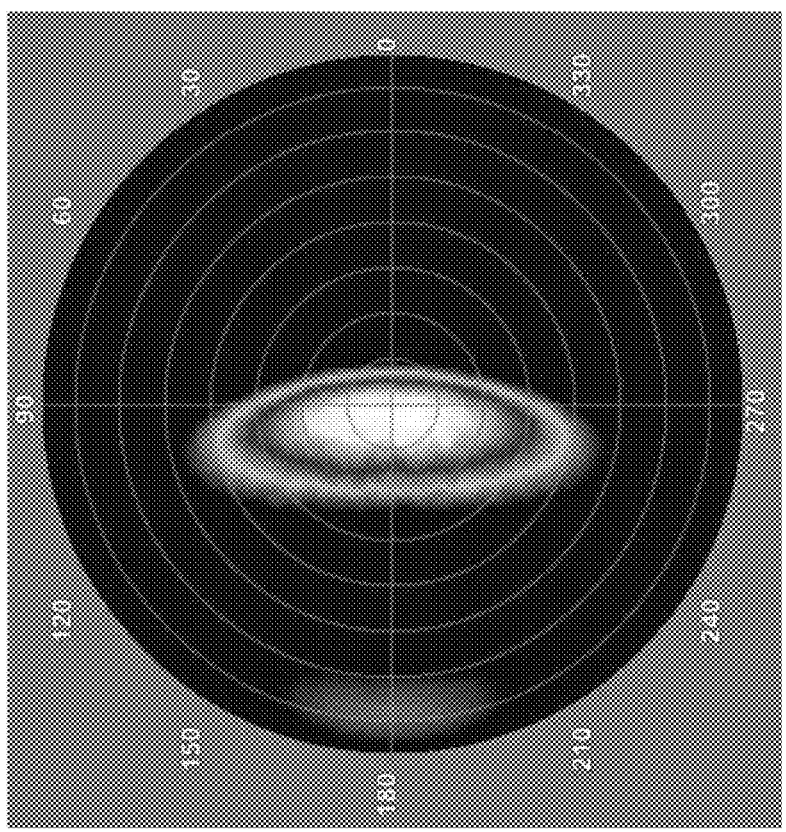
FIG. 4B is a view illustrating a measurement result of the backlight module without the first and second triangular prisms.
Figure 4A:
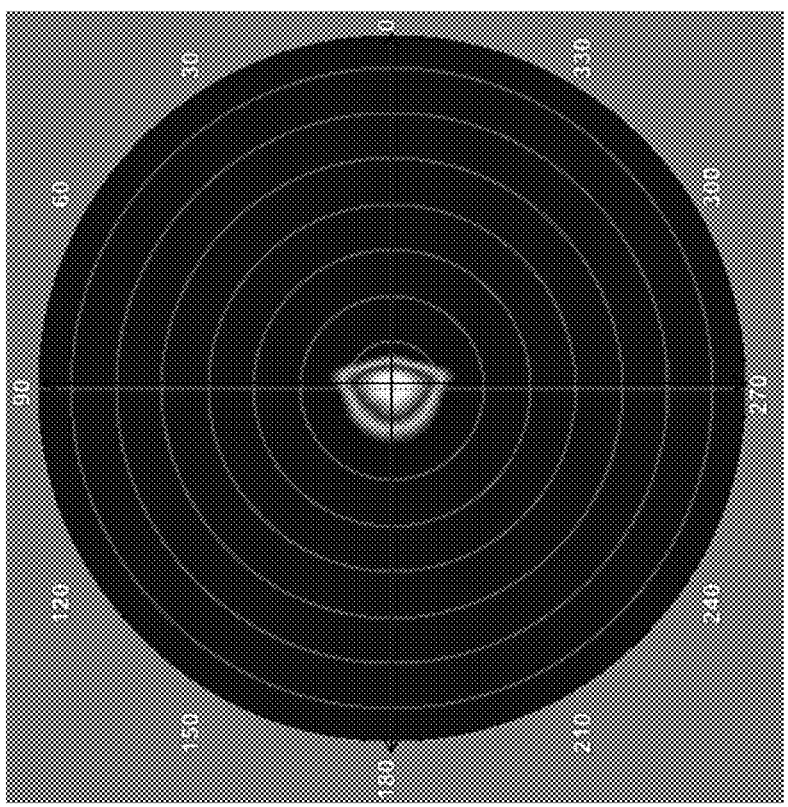
FIG. 4A is a view illustrating a measurement result of the backlight module with first and second triangular prisms according to the disclosure.

A viewing angle photometer, such as CONOMETER® 80 available from Westboro Photonics Inc., is used to measure angular illuminance distributions of the backlight light module 100 of the disclosure having the first and second triangular prisms 111, 112 and a backlight light module without the first and second triangular prisms 111, 112. The angular illuminance distribution of the backlight module 100 shown in FIG. 4A is narrower than the angular illuminance distribution of the backlight module without the first and second triangular prisms 111, 112 as shown in FIG. 4B. FIGS. 4A and 4B demonstrate that the backlight module 100 with the first and second triangular prisms 111, 112 produces more highly collimated beams.

To sum up, because the light guide substrate 1 includes the first and second prisms 111, 112 and the light guide microstructures 121, the backlight module 100 can provide the highly-collimated beams, and the adsorption phenomenon between the reverse prism sheet 2 and the light guide substrate 1 can be reduced to prevent formation of white haze areas. Further, the polycarbonate material of the light guide substrate 1 between the light exit face 11 and the light reflection face 12 can be protected from being scratched.

In the description above, for the purposes of explanation, numerous specific details have been set forth in order to provide a thorough understanding of the embodiment. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. A light guide substrate, comprising:
a light exit face;
a plurality of first triangular prisms directly disposed on said light exit face and extending in an X-axis direction;
a plurality of second triangular prisms directly disposed on said light exit face and extending in the X-axis direction, said first and second triangular prism being juxtaposed to each other in a Y-axis direction, each of said first and second triangular prisms having a rounded vertex extending away from said light exit face in a Z-axis direction, the number of said first triangular prisms being smaller than the number of said second triangular prisms, each of said first triangular prisms having a first height from said light exit face in the Z-axis direction, each of said second triangular prisms having a second height from said light exit face in the Z-axis direction, said second height being between 20 and 90 percent of said first height;
a light reflection face opposite to said light exit face in the Z-axis direction;
a plurality of light guide microstructures disposed on said light reflection face; and
a light entry face extending in the Y-axis direction and interconnecting said light exit and reflection faces.

2. The light guide substrate as claimed in claim 1, wherein the number of said first triangular prisms is not greater than 50 percent of the number of said second triangular prisms.

3. The light guide substrate as claimed in claim 1, wherein said plurality of said first triangular prisms are divided into several groups, said groups of said first triangular prisms are spaced apart from each other in the Y-axis direction by at least one of said second triangular prisms.

4. The light guide substrate as claimed in claim 1, wherein said rounded vertex of each of said first triangular prisms has a curvature radius ranging between 4 and 32 percent of said first height, said rounded vertex of each of said second triangular prisms having a curvature radius ranging between 4 and 32 percent of said second height.

5. The light guide substrate as claimed in claim 1, wherein each of said first and second triangular prisms is an isosceles triangular prism.

6. The light guide substrate as claimed in claim 1, wherein said light guide microstructures are elongate triangular prism structures extending in the Y-axis direction and spaced apart from each other in the X-axis direction.

7. The light guide substrate as claimed in claim 6, wherein each of said light guide microstructures has a first inclined face, and a second inclined face forming a vertex with said first inclined face, said second inclined face being more distal from said light entry face than said first inclined face, an acute angle of said second inclined face with respect to an XY-plane being smaller than an acute angle of said first inclined face with respect to the XY-plane.

8. The light guide substrate as claimed in claim 1, wherein said light exit face has a prism layer formed with said first and second triangular prisms and made of an acrylic resin.

9. A backlight module, comprising:
a light guide substrate of claim 1;
a reverse prism sheet disposed above said light exit face of said light guide substrate, said reverse prism sheet having a plurality of prism lenses, each of said prism lenses extending in the Y-axis direction and having a tip directed to said light exit face; and
a light emitting unit disposed adjacent to said light entry face to emit light rays into said light guide substrate through said light entry face.

10. The backlight module as claimed in claim 9, wherein said light emitting unit includes a plurality of point light sources arranged in a row extending the Y-axis direction.

\* \* \* \* \*